United States Patent [19]

Winter

[11] Patent Number: 5,060,559

[45] Date of Patent: Oct. 29, 1991

[54] TIMED COOKING PROCESS LOCK-OUT FOR A COOKING SYSTEM

[75] Inventor: David Winter, Eaton, Ohio

[73] Assignee: Henny Penny Corporation, Eaton, Ohio

[21] Appl. No.: 307,953

[22] Filed: Feb. 9, 1989

[51] Int. Cl.$^5$ .............................................. A47J 37/12
[52] U.S. Cl. ........................................ 99/325; 99/403; 99/408; 210/85; 210/DIG. 8
[58] Field of Search ................ 99/325, 330, 331, 336, 99/337, 403, 408; 210/85, 90, DIG. 8

[56] References Cited

U.S. PATENT DOCUMENTS

| | | | |
|---|---|---|---|
| 3,483,982 | 12/1969 | Nelson | 210/DIG. 8 |
| 3,648,595 | 3/1972 | Morris | 210/DIG. 8 |
| 3,701,313 | 10/1972 | Boggs | 210/DIG. 8 |
| 4,113,617 | 9/1978 | Bereskin et al. | 210/DIG. 8 |
| 4,372,980 | 2/1983 | Luebke et al. | 99/337 |
| 4,688,475 | 8/1987 | Witt et al. | 99/408 |
| 4,785,725 | 11/1988 | Tate et al. | 99/337 |

*Primary Examiner*—Harvey C. Hornsby
*Assistant Examiner*—Mark Spisich
*Attorney, Agent, or Firm*—Banner, Birch, McKie & Beckett

[57] ABSTRACT

A cooking system is provided which includes a controller which controls a cooking process utilizing a cooking medium, a filter which filters the cooking medium, and a mechanism for determining when the cooking medium should be filtered by the filter. The cooking system further includes a lock-out mechanism responsive to the determining mechanism for inhibiting initiation of the cooking process for a predetermined time period if the determining mechanism determines that the cooking mechanism should be filtered.

20 Claims, 2 Drawing Sheets

TIMED COOKING PROCESS LOCK-OUT FOR A COOKING SYSTEM

BACKGROUND OF THE INVENTION

1. Technical Field

The present invention is generally directed to a control system for use with cooling systems such as deep fat fryers and, more particularly, to a timed cooking process lock-out for such cooking systems.

2. Description of the Prior Art

Although the invention is discussed below in terms of a deep fat fryer, the present invention is generally applicable to restaurant service equipment, such as pressure and open fryers, which require periodic filtering and other maintenance of a cooking medium.

Typically, deep fat fryers have a temperature probe, a heating element, which may be gas or electric for example, a temperature selector enabling a user to select a desired cooking temperature for a particular food product, product select switches for selecting a particular food product, and a control system which controls the heating element to be operated in different modes corresponding to the different stages of operation of a deep fat fryer. For example, there is often provided a first melt mode wherein solid shortening or liquid shortening below a predetermined temperature is heated at a slow rate, generally by pulsing the heating element until the liquid shortening is heated to a predetermined melt reference temperature. Typically, the heater would then be operated in a second mode wherein the temperature of the shortening is rapidly increased to a selected temperature at which cooking is to occur. As noted, a control system is provided which controls the heating element in these modes. Preferably, a programmable control system is provided which is capable of storing cooking information for a plurality of food products to enable an operator to easily and consistently control the cooking operation. Such a programmable control system is described in commonly assigned, copending application Ser. No. 227,886 incorporated herein in its entirety by the foregoing reference thereto.

An important consideration when using a deep fat fryer for cooking is the proper maintenance of the cooking medium. Specifically, if shortening is used, it is necessary to filter the shortening periodically to maintain cooking quality due to absorption of oils and odor from the cooked food products and degradation of the shortening caused by breakdown thereof due to heat, extended use, amount and type of product breading, and other factors. The number of times a type of food product may be cooked in the same shortening before filtering is required varies from one food product to the next. For example, cooking french fries does not require the shortening to be filtered as often as is required with a breaded product, such as breaded fish. It has been found that cooking breaded fish in a deep fat fryer requires the shortening to be filtered more frequently due to various factors including the oil within the fish and the type of breading used. Other products, such as chicken require a filtration rate somewhere between french fries and fish.

Other procedures are also necessary to properly maintain the cooking medium. For example, after shortening has been filtered a certain number of times, degradation is such that the shortening must be replaced to ensure proper cooking. The filter for filtering the cooking medium must also be replaced periodically.

As noted, filtering may be required after the cooking of a certain number of product loads. Other methods for determining the need for filtering such as exceeding a calculated weighted cycle count based on the number and type of product loads cooked may also be employed. Such a weighted cycle count is described in the aforementioned commonly assigned, copending application. Typically, a filter indicator is activated indicating that filtering should occur. The cooking operation of the fryer may be resumed after the operator has performed the filtering or other maintenance procedure.

A problem arises in that even though a filter indicator is activated, sometimes an operator will ignore the indicator or deactivate it without filtering. This sacrifices cooking and product quality. Prior art methods lockout the cooking process until it is determined that filtering or changing of the cooking medium has occurred. These methods include monitoring the temperature of the temperature probe or monitoring the status of a drain valve switch. The former method is, for example, described in U.S. Pat. No. 4,688,475. However, these methods may be bypassed by an operator who desired to ignore the filtering procedure and continue the cooking process. For example, methods monitoring the status of a temperature probe may be bypassed by dropping the shortening level just far enough to expose the temperature probe, and then cooling the probe with a wet rag. Shortening may then be pumped into the fryer back up to the operating levels. Methods which monitor the status of a drain valve switch may be bypassed by flipping the drain valve handle long enough to signal a filtered condition, even though filtering has not actually occurred.

SUMMARY OF THE INVENTION

Accordingly, it is an object of the present invention to provide a method and system which promotes proper maintenance of a cooking medium.

It is another object of the present invention to provide a method and system which inhibit initiation of the cooking process when it is determined that the cooking medium should be subjected to a maintenance procedure.

It is still another object of the present invention to provide a cooking method and system which encourage a user to undertake procedures to properly maintain a cooking medium.

In accordance with the present invention, a cooking system is provided which includes a controller which controls a cooking process utilizing a cooking medium, a filter which filters the cooking medium, and a mechanism for determining when the cooking medium should be filtered by the filter. The cooking system further includes a lock-out mechanism responsive to the determining mechanism for inhibiting initiation of the cooking process for a predetermined time period if the determining mechanism determines that the cooking medium should be filtered.

Also in accordance with the present invention, a method of controlling a cooking system which includes a controller which controls a cooking process utilizing a cooking medium and a filter which filters the cooking medium is provided. First, a determination is made as to when the cooking medium should be filtered. Then, if it is determined that the cooking medium should be filtered, initiation of the cooking process is inhibited for a predetermined time period.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings.

DETAILED DESCRIPTION OF THE PREFERRED EMBODIMENT

Figure 1:
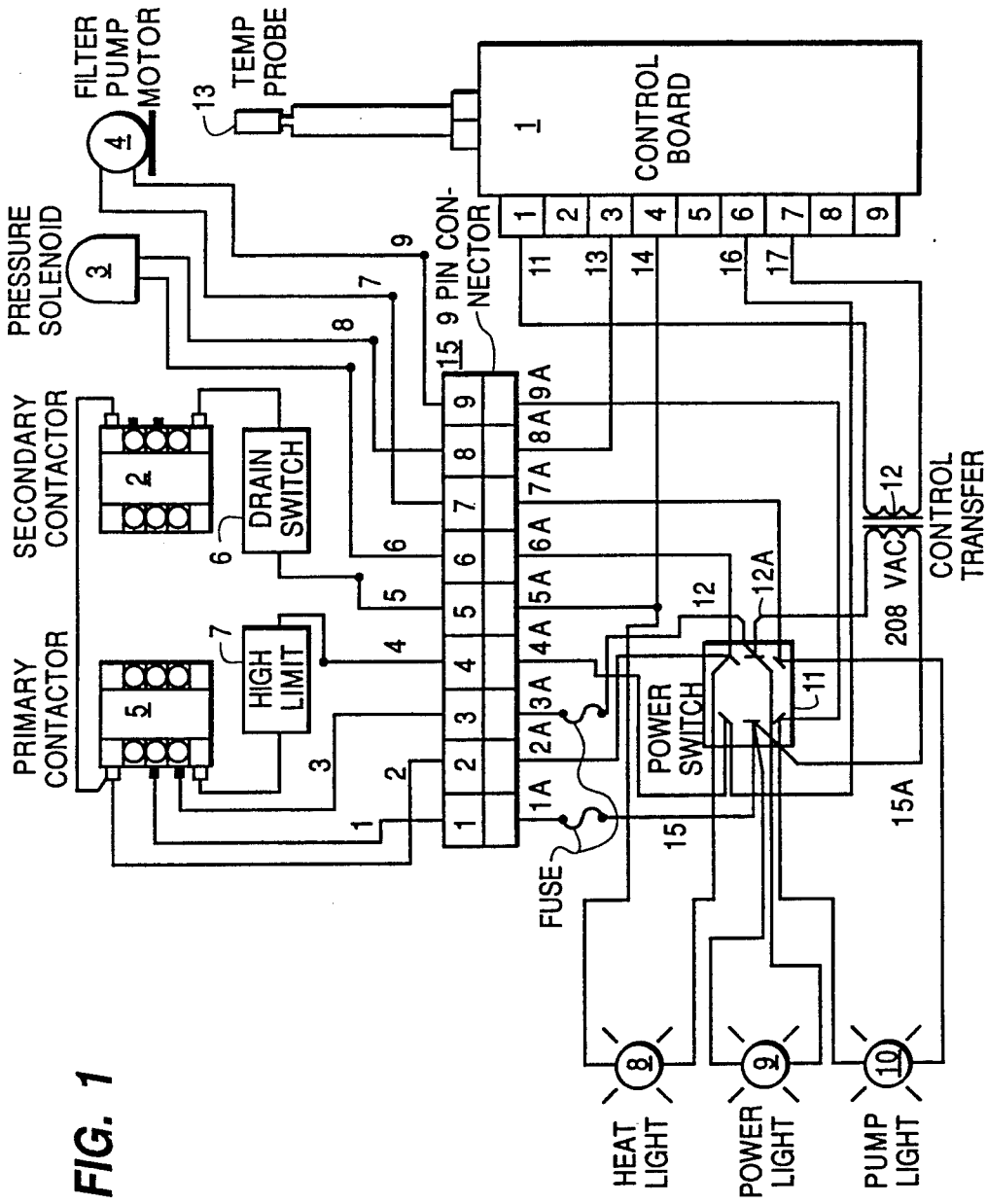
FIG. 1 illustrates a process controller which may be utilized with the present invention.

FIG. 1 is illustrates a process controller which may be used with the present invention. The illustrated cooking press controller is but one suitable embodiment for carrying out the present invention. It will be apparent to one of ordinary skill in the art that modifications may be made without departing from the scope of the invention. Processor control board 1 controls, among other components, the secondary contactor 2 and solenoid valve 3. Secondary contactor 2 controls the heating elements for the fryer. Drain switch 6 cuts power to secondary contactor 2 if the drain valve is open while power is applied to the control board. This prevents overheating of the elements when there is no shortening present in the fry pot. High limit thermostat 7 cuts power to primary contactor 5 if the shortening temperature exceeds the high limit setting. This prevents unsafe operation in the event of a control board or contractor failure. Solenoid valve 3, when closed by the control board, allows the fryer to build steam pressure during a cooking cycle. Filter pump motor 4 pumps shortening back into the fry pot after the shortening is filtered. The filter pump motor is controlled by power switch 11 and switches on when the power switch is set to the pump position. Heat light 8 is connected in parallel with the secondary contactor 2 and switches on the secondary contactor. Power light 9 is controlled by power switch 11 and switches on when the power switch is set to the power position. Pump light 10 is controlled by the power switch. It is connected in parallel with the pump motor 4 and turns on when the power switch is set to the pump position. Power switch 11 controls power to the fryer components and the control board. It is a three position switch. In the centered off position, no power is applied to the solenoid or the contactors. Control transformer 12 steps down the line voltage to supply power to the control board. Temperature probe 13 is mounted in the fry pot and develops a resistance proportional to the shortening temperature. Nine pin connector 15 provides connection between the control board and the other fryer components.

Figure 2:
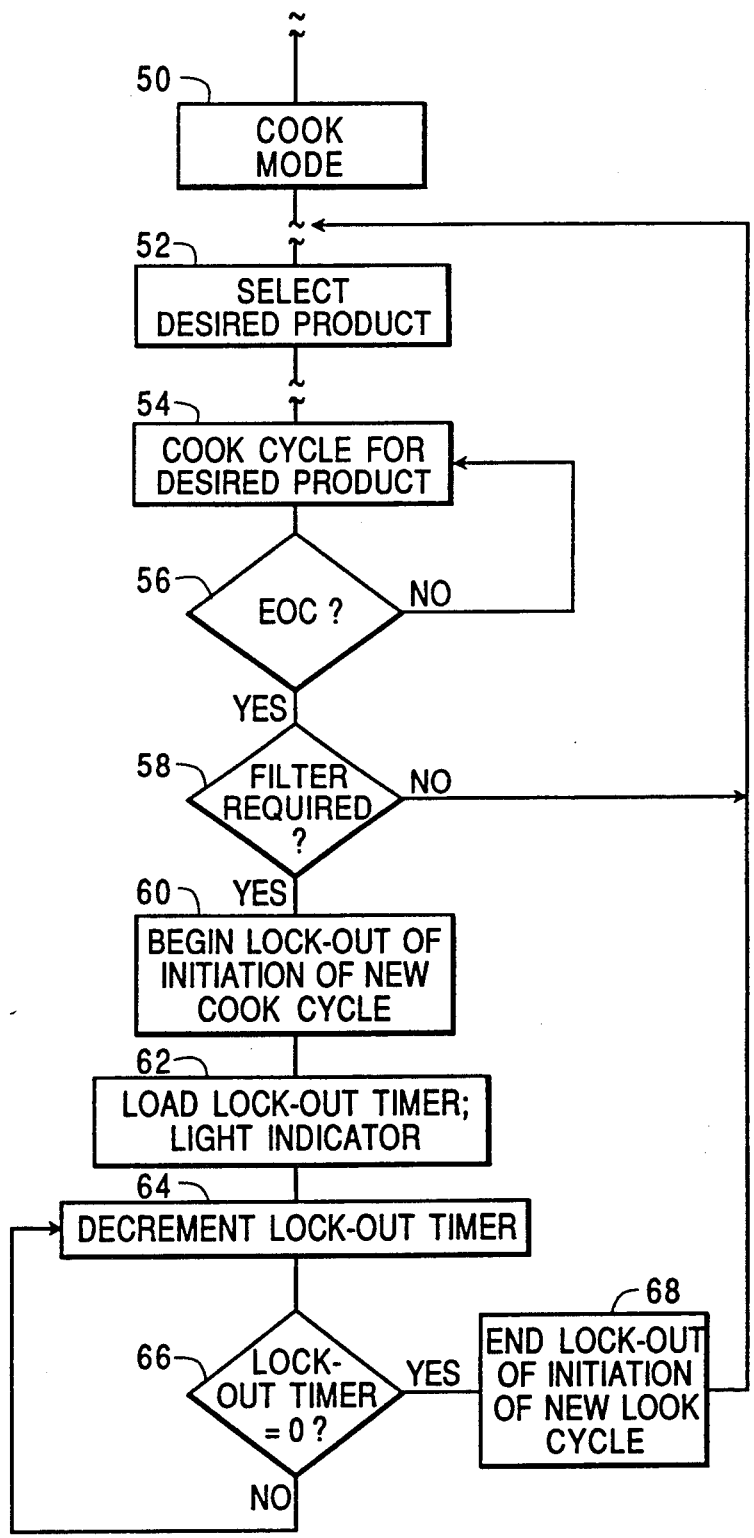
FIG. 2 is a flow chart illustrating the operation of the present invention.

The present invention will be explained below with reference to the flow chart of FIG. 2. Step 5 illustrates entry into the cook mode in which the product is actually cooked. As indicated, the illustrated blocks may be part of a larger overall control sequence. Such a control sequence is disclosed in the aforementioned commonly assigned application, but the invention is not limited in this respect. The product to be cooked is selected at step 52. For a deep-fat fryer, such products may include french fries, fish, or chicken. The selected product is cooked according to a predetermined cook cycle as shown at step 54. Again, various cook cycles for different products are known in the art and the invention is not limited in this respect. For clarity, it is to be understood that the use of the word cycle herein refers to the basic unit of the product cooking control process or sequence. By selecting a preprogrammed cycle, a user specifies the cooking times, temperatures, pressures, etc. for a selected product. As described below, in accordance with the present invention, initiation of a new cooking cycle by a user is inhibited for a predetermined time period when it is determined that filtering (or other cooking medium maintenance operations) should occur.

When the control sequence determines the end of the cooking cycle at 56, control passes to block 58 where a determination is made as to whether filtering of the shortening is required. Various techniques for ascertaining whether filtering is required are known, such as that described in the above-mentioned commonly assigned application and discussed in greater detail below.

If filtering is required, initiation of a new cooking cycle by a user is locked out at step 60 by the control sequence, i.e., operation of the fryer is inhibited for a predetermined time period as described immediately below. As shown at step 62, a lock-out timer or counter is loaded and a visual indication of the lock-out may be provided. The lock out timer is decremented as shown at step 64, and a determination is made at step 66 whether the lock-out timer has reached zero. If not, control returns to step 64 and the counter is again decremented. When the timer reaches zero, control passes to step 68 where the lock-out of the initiation of a new cook cycle is ended.

Thus, when the control sequence has determined that it is time to filter and lock-out the initiation of a new cooking cycle, a timer is loaded with an initial value and started. In a preferred embodiment, this timer is decremented at regular intervals until the timer value is zero. The start of a new cooking cycle is prevented while the timer is decremented. Displays or other annunciators may indicate that filtering is in process. The displays or other annunciators may also be used to display the value of the timer. When the timer value is zero, the new cooking cycle may be commenced. The timer may be a hardware circuit or implemented in the control sequence software of the fryer. The initial timer value may be selected such that a skilled operator can finish the filtering process to a certain quality level just as the timer value decrements to zero. The timer may be set for example to approximately two minutes, although the invention is not limited in this respect. In addition, the initial timer value may be fixed at the time of manufacture, or it may be programmable via front or back panel controls to accommodate site specific requirements.

The present invention helps to guarantee that the filtering process is performed to quality standards by removing incentive to "cheat the system". Since the initiation of a new cooking cycle is not dependent on the status of system transducers or actuators, altering the status of those elements through abnormal operator actions will not permit initiation of a new cooking cycle. Whether or not the operator chooses to filter, the lock-out prevents start of a new cooking cycle for a time period at least equal to the time required to filter.

One method of determining when it is time to filter the shortening is described in the aforementioned commonly assigned, copending application which discloses a weighted cycle count feature. Various types of food products and cooking cycles may be mixed or repeated and the control system determines when the shortening should be filtered based on which cycles have cooked, not just a total number of cycles. In order to use this feature of the control, it is necessary to program each cycle with the cycle count. This number is easy to determine and is user selectable based on prior experience, etc. It is the number of cycles to cook before filtering if only that cycle were cooked repeatedly. If this number is set to zero for recycle, then cooking that cycle will not contribute to the eventual filter indication. To determine that it is time to filter, the control adds the reciprocal of the cycle count to a running total at the end of each cook cycle. When that total approached a predetermined number, e.g., 1 the filter indication is given.

An example of the weighted cycle count is as follows.

EXAMPLE

Suppose that the following cycle counts have been programmed for cycles 1-6.

| Cycle | Cycle Count | Reciprocal of Cycle Count |
| --- | --- | --- |
| 1 | 2 | 0.500 |
| 2 | 1 | 1.000 |
| 3 | 4 | 0.250 |
| 4 | 3 | 0.333 |
| 5 | 10 | 0.010 |
| 6 | 0 | (not applicable) |

EXAMPLE 1

If cycle 2 was used, a filter indication would be given immediately at the end of that cycle, since its cycle count is 1. In addition if cycle 2 is used after any other cycle, the filter indication would be given.

EXAMPLE 2

If cycle 1 was cooked twice, the filter indication would be given, since $0.5 + 0.5 = 1$.

EXAMPLE 3

The cooking sequence of cycles 3, 4, 10, 4 would give the filter indication, since $0.25 + 0.333 + 0.010 + 0.25 = 0.93$, which is close to 1. Exactly how close to 1 the count must be before the filter indication is given may be varied as will be apparent to one of ordinary skill in the art.

EXAMPLE 4

If cycle 6 was cooked 20 times, a filter indication would not occur because the cycle count is zero. This disables the counting of cycle 6.

EXAMPLE 6

Suppose that, as in Example 3 above, the cycles 3 and 4 were cooked, then the fryer were shutdown for the day. The next day cycles 10 and 4; were cooked. The filter indication would be given at this point. The control has remembered that cycles 3 and 4 were cooked the day before, but filtering was not done. The implementation of this feature will be apparent to one of ordinary skill in the art.

Although one method of determining when filtering should occur is described above, this method is intended to be illustrative only and the invention is not limited in this respect. For example, filtering may take place after every cooking cycle or after a predetermined number of cycles fixed by an operator.

It is to be understood that the terms operator or user refer to one who is actually operating or using the cooking system "in the field". Programming by the user of a user selectable parameter may take place in the field.

As noted above, the lock-out or inhibition of new cooking cycles is readily applicable to other maintenance procedures which ensure efficient cooking by the cooking medium. For example, the cooking medium should be periodically replaced. This may take place after a predetermined number of cooking cycles, after a predetermined number of filterings, or after a predetermined amount of cooking time. Each of these factors may be monitored utilizing well-known techniques such as incrementing or decrementing counters. For example, suppose the cooking medium should be changed after 50 cooking cycles. An operator could program the fryer control system to monitor the number of cooking cycles and provide a visual or audible indication when 50 cooking cycles have been performed. The initiation of a new cooking cycle would then be inhibited for a predetermined time period. This predetermined time period should be of sufficient duration to permit drainage and filling of the fryer pot for the cooking medium and to permit any cleaning of the fryer pot which may be necessary. The time period may be user programmed or programmed at the time of manufacture.

An operator could similarly program the fryer control system to monitor the number of filtering operations performed by the currently installed filter to determine when the filter should be changed. For example, suppose the filter should be changed after 100 filtering operations. An operator could program the fryer control system to monitor the number of filter operations and provide a visual or audible indication when 100 filter operations have been performed. The initiation of a new cooking cycle would then be inhibited for a predetermined time period. The predetermined time period should be of sufficient duration to permit the filter to be changed. The time period will be dependent on the type of fryer. The time period may be user programmed or programmed at the time of manufacture.

The invention has been described in detail in connection with the preferred embodiments. These embodiments, however, are merely for example only and the invention is not limited thereto. It will be easily understood by those skilled in the art that other variations and modifications can easily be made within the scope of this invention as defined by the appended claims.

I claim:

1. A cooking system comprising:
   filter means for filtering a cooking medium;
   first determining means for determining when the cooking medium should be filtered by said filter means;
   a counter responsive to said first determining means for fixing a predetermined initial count corresponding to a first predetermined time period if said first determining means determines that the cooking medium should be filtered, said counter being decremented from said initial count to a predetermined final count to define the first predetermined time period;
   count means for controlling a cooking process of said cooking system, said control means including means responsive to said first determining means and said counter for inhibiting initiation of the cooking process during the first predetermined time period fixed by said counter and for permitting initiation of the cooking process after said counter has decremented to the predetermined final count.

2. The cooking system according to claim 1 wherein the first predetermined time period is of sufficient duration to permit filtering of the cooking medium.

3. The cooking system according to claim 1 wherein the first predetermined time period is approximately two minutes.

4. The cooking system according to claim 1 wherein the cooking medium comprises shortening.

5. The cooking system according to claim 1 further comprising:
second determining means for determining when the cooking medium should be replaced, said control means including means responsive to said second determining means for inhibiting initiation of the cooking process for a second predetermined period of time if said second determining means determines the cooking medium should be replaced.

6. The cooking system according to claim 5 further comprising:
third determining means for determining when said filter means should be replaced, said control means including means responsive to said third determining means for inhibiting initiation of the cooking process for a third predetermined period of time if said third determining means determines said filter means should be replaced.

7. The cooking system according to claim 1 further comprising:
indicator means for indicating that said control means is inhibiting initiation of the cooking process.

8. A cooking system comprising:
filter means for filtering a cooking medium;
first determining means for determining when the cooking medium should be filtered by said filter means;
timer means responsive to said first determining means for fixing a predetermined initial count if said first determining means determines that the cooking medium should be filtered; and wherein the timer is decremented from said initial count to a predetermined final count to define a first predetermined time period;
control means for controlling a cooking process of said cooking system, said control means including means responsive to said first determining means and said timer means for inhibiting initiation of the cooking process during the first predetermined time period fixed by said timer means and for permitting initiation of the cooking process after a time period equal to the first predetermined time period fixed by said timer means has elapsed.

9. The cooking system in accordance with claim 8 further comprising:
second determining means for determining when the cooking medium should be replaced, said timer means further responsive to said second determining means for setting a second predetermined time period if said second determining means determines the cooking medium should be replaced whereby said control means inhibits initiation of the cooking process for the second predetermined time period.

10. The cooking system in accordance with claim 9 further comprising:
third determining means for determining when said filter means should be replaced, said timer means for further responsive to said third determining means for setting a third predetermined time period if said third determining means determines that said filter means should be replaced whereby said control means inhibits initiation of the cooking process for the third predetermined time period.

11. The cooking system in accordance with claim 8 wherein said timer means comprises a counter.

12. The cooking system in accordance with claim 11 wherein said counter is set with a count corresponding to the first predetermined time period and is decremented to a predetermined count to define the first predetermined time period, said control means being responsive to said counter to permit initiation of the cooking process after said counter has decremented to the predetermined final count.

13. A cooking system comprising:
filter means for filtering a cooking medium;
determining means for determining when the cooking medium should be replaced;
timer means responsive to said determining means for fixing a predetermined initial count if said determining means determines that the cooking medium should be replaced; and
wherein the timer is decremented from said initial count to a predetermined final count to define a first predetermined time period;
control means for controlling a cooking process of said cooking system, said control means including means responsive to said determining means and said timer means for inhibiting initiation of the cooking process during the predetermined time period fixed by said timer means and for permitting initiation of the cooking process after a time period equal to the predetermined time period fixed by said timer means has elapsed.

14. The cooking system according to claim 13 further comprising:
indicator means for indicating that said control means is inhibiting initiation of the cooking process.

15. The cooking system in accordance with claim 13 wherein said timer means comprises a counter.

16. The cooking system in accordance with claim 15 wherein said counter is set with a count corresponding to the predetermined time period and is decremented to a predetermined count to define the predetermined time period, said control means being responsive to said counter to permit initiation of the cooking process after said counter has decremented to the predetermined final count.

17. A cooking system comprising;
filter means for filtering a cooking medium;
determining means for determining when the filter means should be replaced;
timer means responsive to said determining means for fixing a predetermined initial count if said determining means determines that said filter means should be replaced; and
wherein the timer is decremented from said initial count to a predetermined final count to define a first predetermined time period;
control means for controlling a cooking process of said cooking system, said control means including means responsive to said determining means and said timer means for inhibiting initiation of the cooking process during the predetermined time period fixed by said timer means and for permitting initiation of the cooking process after a time period equal to the predetermined time period fixed by said timer means has elapsed.

18. The cooking system in accordance with claim 17 further comprising: indicator means for indicating that said control means is inhibiting initiation of the cooking process.

19. The cooking system in accordance with claim 17 wherein said timer means comprises a counter.

20. The cooking system in accordance with claim 19 wherein said counter is set with a count corresponding to the predetermined time period and is decremented to a predetermined count to define the predetermined time period, said control means being responsive to said counter to permit initiation of the cooking process after said counter has decremented to the predetermined final count.

* * * * *